United States Patent
Phan et al.

(10) Patent No.: US 7,100,826 B1
(45) Date of Patent: Sep. 5, 2006

(54) BARCODE MARKING OF WAFER PRODUCTS FOR INVENTORY CONTROL

(75) Inventors: Khoi A. Phan, San Jose, CA (US); Michael K. Templeton, Atherton, CA (US); Bhanwar Singh, Morgan Hill, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 858 days.

(21) Appl. No.: 09/817,615

(22) Filed: Mar. 26, 2001

(51) Int. Cl.
G06F 19/00 (2006.01)
G06F 17/00 (2006.01)

(52) U.S. Cl. ............. 235/385; 235/462.01; 700/116; 700/121; 700/224

(58) Field of Classification Search ................. 235/462.01–462.49, 375, 376, 385, 454; 700/116, 223, 224, 225, 214, 121; 705/22, 705/28
See application file for complete search history.

(56) References Cited

U.S. PATENT DOCUMENTS

| | | | | |
|---|---|---|---|---|
| 4,027,246 A | * | 5/1977 | Caccoma et al. | ............ 700/121 |
| 4,636,634 A | * | 1/1987 | Harper et al. | ............ 250/223 R |
| 5,432,702 A | * | 7/1995 | Barnett | ............ 700/116 |
| 5,567,927 A | * | 10/1996 | Kahn et al. | ............ 235/462.01 |
| 6,018,688 A | * | 1/2000 | Hashimoto | ............ 700/215 |
| 6,061,605 A | * | 5/2000 | Davis | ............ 700/121 |
| 6,420,792 B1 | * | 7/2002 | Guldi et al. | ............ 257/797 |
| 6,896,186 B1 | * | 5/2005 | Kudo | ............ 235/462.11 |

* cited by examiner

Primary Examiner—Thien M. Le
Assistant Examiner—Jamara A. Franklin
(74) Attorney, Agent, or Firm—Amin & Turocy, LLP

(57) ABSTRACT

A system for performing inventory control for wafers, unpackaged integrated circuits and packaged integrated circuits is provided. The system includes barcode readers, sorters and transporters operable to locate and relocate wafers, unpackaged circuits and packaged circuits. The system further includes a feedback system for feeding back information generated by the barcode readers, sorters, transporters and/or manufacturing devices associated with the wafers, unpackaged circuits and packaged circuits. The system further provides for generating Electronic Data Interchange (EDI) data that can be transmitted to wafer suppliers and employed in controlling wafer ordering, purchasing, processing and returning.

30 Claims, 11 Drawing Sheets

BARCODE MARKING OF WAFER PRODUCTS FOR INVENTORY CONTROL

TECHNICAL FIELD

The present invention generally relates to inventory control, and in particular to systems and methods for facilitating inventory control of wafer products and circuits marked with a barcode.

BACKGROUND OF THE INVENTION

In the semiconductor industry, there is a continuing trend toward higher volume processing. Such higher volume processing requires larger inventories of raw materials for manufacturing and produces large quantities of intermediate and finished goods. The raw materials include wafers suitable for being processed into integrated circuits. The finished goods include unpackaged and packaged integrated circuits. Conventionally, inventory control of such items has been performed manually, or not performed at all. For example, wafers produced by the consumer of the wafer and/or wafers received from a supplier of wafers can be stored using manual systems and/or methods (e.g. containers on shelves in warehouses). Locating wafers stored using such manual systems and/or methods can be inefficient and difficult, and thus time-consuming and costly.

There are multiple steps involved in manufacturing integrated circuits. Such steps include, but are not limited to, cleaning a wafer, depositing one or more layers on a wafer, etching one or more features in a wafer, cutting a wafer into pieces and packaging a circuit after it has been cut from a wafer. Such steps can employ manufacturing devices including, but not limited to, steppers and spin tracks. Imperfections may be generated at one or more such steps. Thus, during the multiple manufacturing steps, a wafer may need to be located several times, presented to several manufacturing devices, tested several times and stored several times. Similarly, a circuit cut from a wafer may need to be located repeatedly and processed repeatedly. After packaging, an integrated circuit may, for example, be embedded in a machine or distributed to an integrated circuit consumer. Once the circuit leaves the fabricating facility, it has, conventionally, been difficult to track the circuit, which has hampered external quality control. Locating, tracking and relocating wafers using conventional systems and/or methods can introduce processing delays and can lead to the loss of wafers and/or inappropriate processing (e.g. performing a processing step on a wafer an inappropriate number of times, performing a processing step on the wrong wafer). Similarly, locating, tracking and relocating circuits after they have been cut from wafers using conventional systems and/or methods can introduce processing delays and can lead to the loss of circuits and/or inappropriate processing (e.g. performing an unnecessary step on a circuit, performing a processing step on the wrong circuit).

Wafers may vary in quality, number, properties and availability. Providing a consistent supply of high quality wafers is important to efficient integrated circuit manufacturing. Conventionally, placing orders for wafers may be performed manually, or in accordance with a schedule. Such conventional ordering methods can lead to oversupply, and/or undersupply, which can negatively impact efficient integrated circuit manufacturing.

Thus, there remains a need for a system and method to mitigate problems associated with conventional wafer and circuit inventory and quality control.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides a system for performing inventory control that benefits from barcode markings on wafers, unpackaged integrated circuits and packaged integrated circuits. The system can include one or more inventories of wafers marked with barcodes, one or more inventories of unpackaged circuits marked with barcodes and one or more inventories of packaged circuits marked with barcodes. Such inventories can be employed to store wafers, unpackaged circuits and packaged circuits and to retrieve wafers, unpackaged circuits and packaged circuits based, at least in part, on an addressable location wherein such items are stored. For example, a human and/or a mechanical device could store a wafer in a rack of wafers, the rack addressable by humans and machines. The system can also include one or more barcode readers operable to read barcodes on wafers, unpackaged circuits and packaged circuits. The barcode readers can include, but are not limited to, fixed barcode readers and portable (e.g. handheld) barcode readers. Data from the barcode readers can be passed to one or more sorters that can route the wafers, unpackaged circuits and packaged circuits to appropriate destinations, based, at least in part, on information encoded in the barcodes. By way of illustration, barcodes on one or more wafers in a first inventory may be read, and data concerning those barcodes passed to a sorter, which may route the wafers to a second inventory so that the wafers end up sorted in a desired order. For example, the wafers may be sorted according to manufacturer, supplier, date of manufacture, processing stage and wafer properties. By way of further illustration, barcodes on one or more wafers in a first inventory may be read, and data concerning those barcodes passed to a sorter, which may route the wafers to one or more manufacturing devices so that the wafers end up in appropriate manufacturing devices. For example, wafers from a first supplier may be routed to a first manufacturing device while wafers from a second supplier may be routed to a second manufacturing device. Such routing may improve integrated circuit manufacturing efficiency by facilitating optimizing manufacturing devices to interact with wafers from certain suppliers, for example. By way of still further illustration, barcodes on packaged circuits may be read to determine whether a recall notice for a group of integrated circuits applies to the packaged circuit. Further, barcodes on packaged circuits that fail in the field may be read, and information encoded therein collected to facilitate determining failure rates and correlating field failures to production runs, for example.

The system can also include a feedback system that can accept feedback information from devices adapted to generate feedback information including, but not limited to the one or more barcode readers, the one or more sorters and/or the one or more manufacturing devices. The feedback information can be employed to generate control information that can be employed to alter the behavior of the generating devices. For example, a sorter may generate feedback information that the sorter is malfunctioning, and thus control information may be generated to route wafers to sorters that are functioning properly and to not route wafers to the sorter that is malfunctioning.

The system can also include an Electronic Data Interchange (EDI) system. The EDI system can collect information from sources including, but not limited to, the inventories, sorters, barcode readers, manufacturing devices and feedback system. The EDI system can generate information that can be transmitted to manufacturers and/or suppliers of wafers, the generated information relating to topics including, but not limited to, ordering wafers, canceling orders for wafers and reporting defect levels in wafer production runs.

The system can also include one or more barcode data stores. The barcode data stores can be employed to store information including, but not limited to, the type and number of wafers located in one or more devices, one or more tables for mapping codes found in a bar code to information associated with such codes, one or more rules for routing wafers, type and number of unpackaged circuits located in one or more devices, one or more rules for routing unpackaged circuits, type and number of packaged circuits located in or more devices and one or more rules for routing packaged circuits.

The present invention also provides a method for performing inventory control. The method includes receiving a wafer and/or information from one or more wafer sources. The wafer can be marked with a barcode that contains information concerning the wafer. The method includes reading one or more barcodes on a wafer. Information encoded in the barcode can include, but is not limited to, the manufacturer of the wafer, wafer properties (e.g. chemical composition, thickness, refractive indices), manufacture date and production run. Information available from the wafer sources can include, but is not limited to, data concerning the availability of the wafer sources, the number and/or type of wafers available in a wafer source and processing times and/or costs associated with retrieving wafers from a wafer source. The method also includes sending a wafer to one or more wafer destinations, based, at least in part, on the information encoded in the barcode. The method further includes marking an unpackaged circuit with a barcode that can be employed to relate the unpackaged circuit to other related unpackaged circuits (e.g., circuits fabricated on the same wafer, circuits fabricated using the same reticle), wafers and/or packaged circuits, for example. Similarly, the method further includes marking a packaged circuit with a barcode that can be employed to correlate the packaged circuit to other related packaged circuits (e.g., circuits fabricated on the same wafer, circuits fabricated using the same reticle, circuits fabricated on the same day), wafers and/or unpackaged circuits, for example. Such barcode marking facilitates performing various inventory control functions and various quality control functions.

The method can also include generating EDI information. The EDI information can be transmitted to EDI information destinations and employed for actions including, but not limited to, ordering wafers and/or circuits, canceling orders for wafers and/or circuits and reporting wafer and/or circuit defects.

The present invention also provides a computer readable medium. The computer readable medium can contain computer executable instructions operable to perform the method for performing inventory control based, at least in part, on barcode markings on wafers, unpackaged circuits and packaged circuits.

The present invention also provides for a data packet that can be transmitted between two or more computer processes, the data packet containing information related to performing inventory control of wafers, unpackaged circuits and packaged circuits, where the wafers, unpackaged circuits and packaged circuits are marked with barcodes.

To the accomplishment of the foregoing and related ends, the invention comprises the features hereinafter fully described and particularly pointed out in the claims. The following description and the annexed drawings set forth in detail certain illustrative aspects of the invention. These aspects are indicative of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
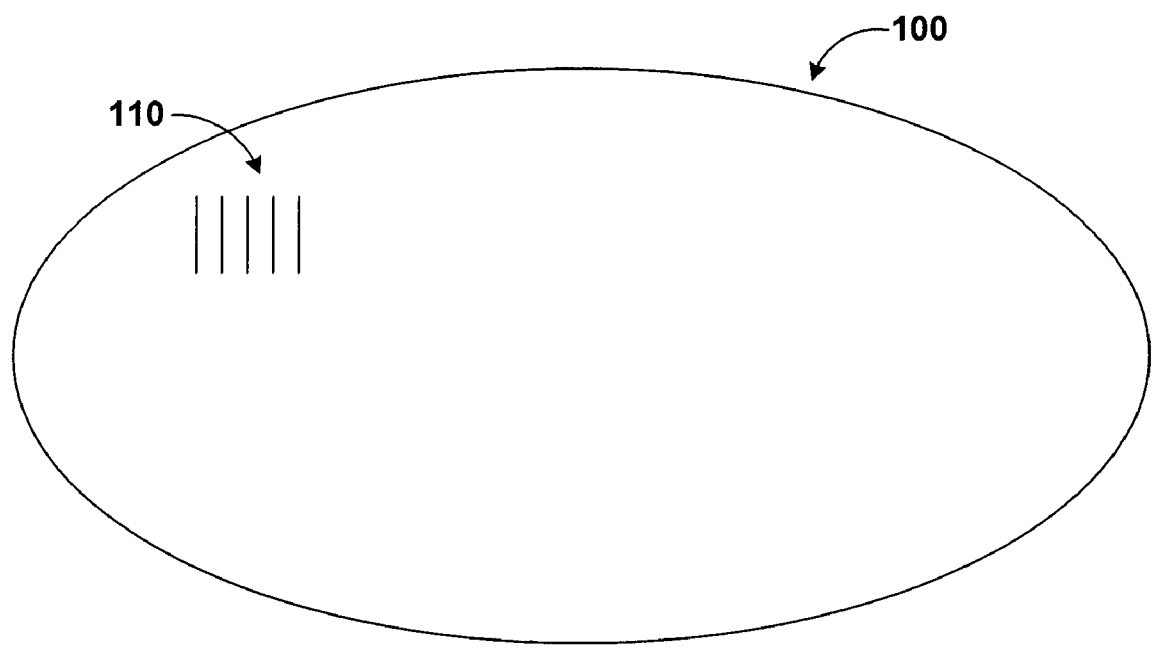
FIG. 1 is a top view of a wafer product marked with a barcode in accordance with the present invention.

The present invention will now be described with reference to the drawings, wherein like reference numerals are used to refer to like elements throughout. The present invention will be described with reference to a system for performing inventory control of wafers marked with barcodes. It should be understood that the description of these exemplary aspects are merely illustrative and that they should not be taken in a limiting sense.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks may be employed.

Referring initially to FIG. 1, a wafer 100 is illustrated. The wafer 100 is marked with a barcode 110. The wafer 100 can be, for example, a silicon wafer suitable for processing into integrated circuits. The wafer 100 can be manufactured by the consumer of the wafer 100 and/or could be acquired from one or more suppliers. The bar code 110 can be formatted according to at least one of, three of nine format, code ninety three format, interleaved code two of five format, code one twenty eight format, Colorado barcode format and two-dimensional format. The bar code 110 can encode information including, but not limited to, the manufacturer of the wafer 100, the manufacture date of the wafer 100, the manufacture time of the wafer 100, the production run of the wafer 100, the materials from which the wafer 100 was produced, conditions under which the wafer 100 was produced and properties of the manufactured wafer 100. The properties of the manufactured wafer 100 can include, but are not limited to, chemical composition, thickness, refractive indices and dimensions.

The information encoded in the bar code 110 can be employed to facilitate inventory control of the wafer 100. For example, the information can facilitate more precise locating, relocating, routing and/or ordering of the wafer 100, thus mitigating problems associated with conventional wafer inventory control systems. Although one barcode 110 is illustrated on the wafer 100, it is to be appreciated that more than one barcode can be marked on the wafer 100 in accordance with the present invention and that multiple barcodes can be of consistent or varying formats.

Figure 2:
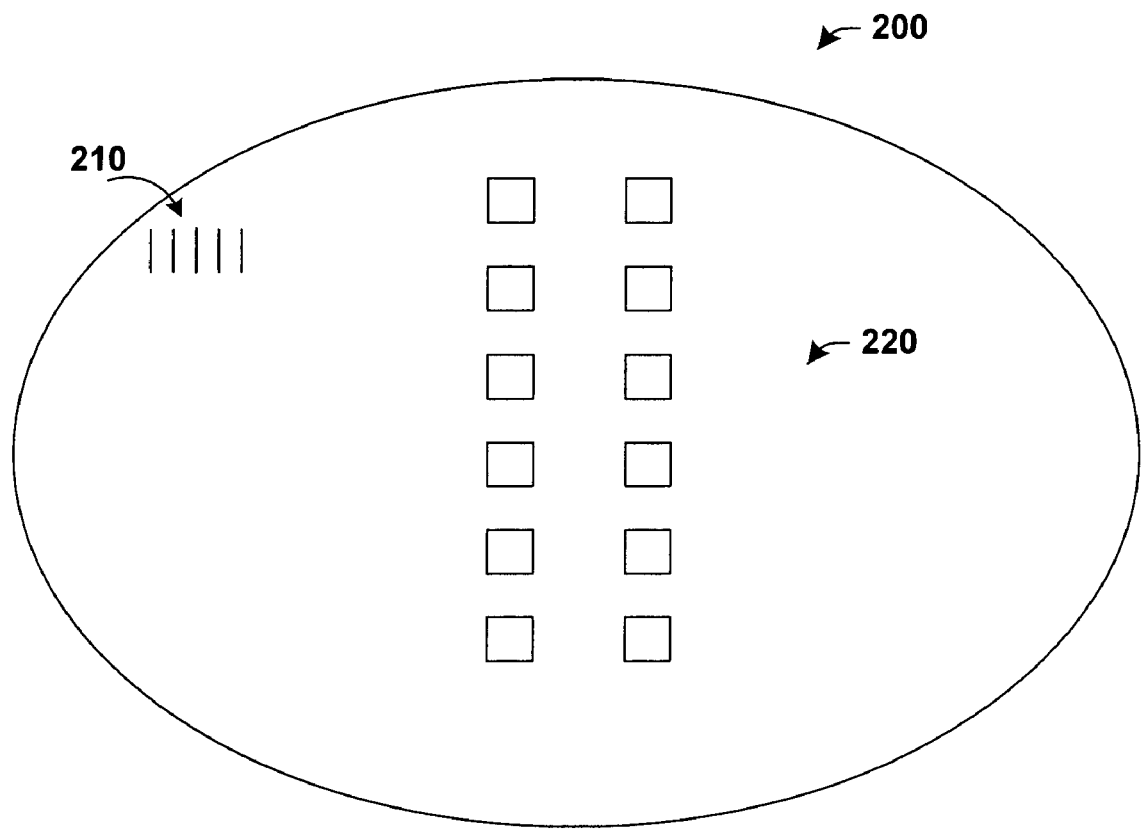
FIG. 2 is a top view of a wafer product marked with a barcode, the wafer product including a plurality of integrated circuits manufactured thereon in accordance with the present invention.

Turning now to FIG. 2, a wafer 200 is illustrated. The wafer 200 is marked with a barcode 210. The wafer 200 includes a plurality of integrated circuits 220 being manufactured on the wafer 200. The manufacturing of the integrated circuits 220 can include techniques like deposition and etching, for example. Similarly, the manufacturing of the integrated circuits 220 can be performed in devices like steppers and spin tracks. Manufacturing the integrated circuits 220 on the wafer 200 can require numerous steps requiring locating, processing and relocating the wafer 200. For example, the wafer 200 may need to be cleaned in a first device, may need to have one or more layers (e.g. oxide, nitride, conducting, insulating, dielectric) deposited thereon in a second device, may need to be etched by a third device and may need to be cut into smaller pieces by a fourth device. Such steps may be performed by one or more machines with those machines performing differently for wafers with different properties. For example, a first wafer may benefit from being etched by a first etching device, while a second wafer may benefit from being etched by a second etching device. Thus, a system for determining to which device a wafer 200 should be routed is required.

The barcode 210 facilitates locating a wafer 200 to process and determining to which device the wafer 200 should be routed by facilitating locating stored information about the wafer 200. The bar code 210 further facilitates updating information stored about the wafer 200. For example, as the wafer 200 is processed by one or more manufacturing devices, information concerning the wafer 200 can be updated to reflect the stages of processing through which the wafer 200 has passed by using information encoded in the barcode to index a store of data. By way of illustration, after an oxide layer has been deposited upon the wafer 200, information concerning the wafer 200 can be updated to reflect that the oxide layer has been deposited upon the wafer 200. In one example aspect of the present invention, the integrated circuits 220 being fabricated on the wafer 200 can be individually marked with one or more barcodes. Such barcodes may contain information related to the barcode 210 and may contain additional and/or alternative information. For example, the barcodes on the integrated circuits 230 may encode information including, but not limited to, the wafer upon which the circuit was fabricated, the process conditions under which the circuit was fabricated, the time/date of manufacture, a circuit identifier and the apparatus employed to fabricate the circuit (e.g., stepper id, reticle id). Thus, inventory control similar to that facilitated for the wafer 200 may be achieved for the circuits 230.

Figure 3:
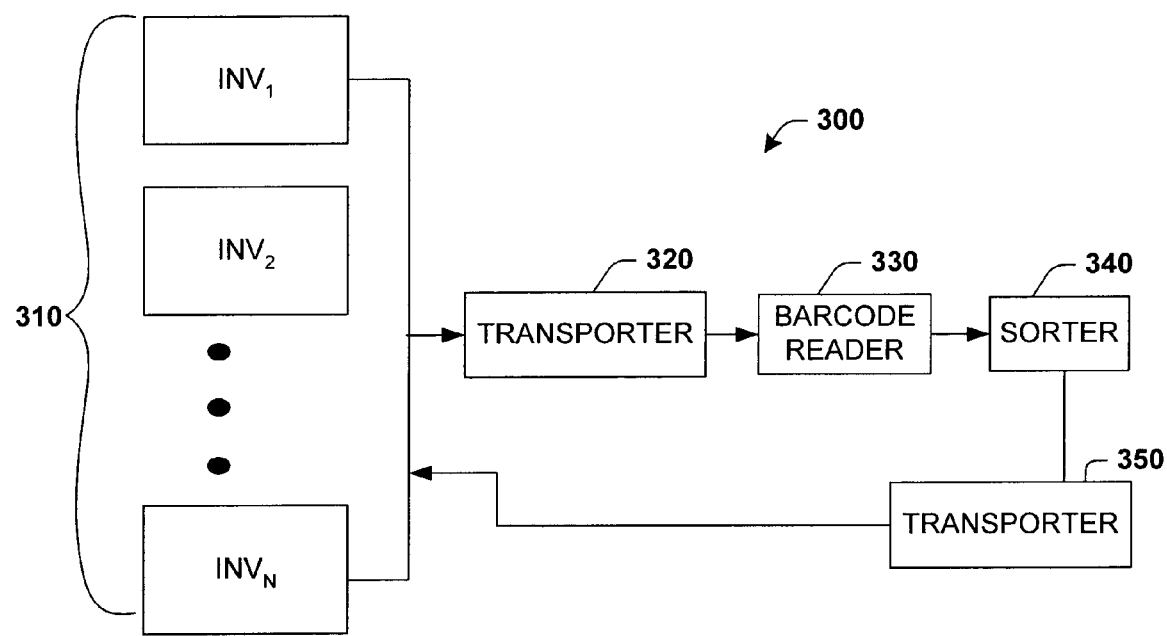
FIG. 3 is a schematic block diagram illustrating a system for performing inventory control of wafers marked with barcodes, in accordance with an aspect of the present invention.

Turning now to FIG. 3, a schematic block diagram illustrates a system 300 for performing inventory control of wafers, wherein the wafers are marked with barcodes. While the discussion associated with FIG. 3 focuses primarily on wafers, it is to be appreciated that similar inventory control may be achieved for individually marked integrated circuits, both unpackaged and packaged, as they pass through various circuit fabrication apparatus. The system 300 includes one or more inventories 310 of wafers, the wafers being marked with one or more barcodes. The inventories 310 can be, but are not limited to being, mechanically accessed devices and/or manually accessed devices. The inventories 310 can be located, but are not limited to being located in one central location and/or in multiple distributed locations. One or more of the inventories 310 can be adapted to facilitate accessing a single designated wafer, the wafer being identified, at least in part, by one or more barcodes located on the wafer. Similarly, one or more of the inventories 310 can additionally and/or alternatively be adapted to facilitate accessing a group of designated wafers, the wafers similarly being identified, at least in part, by one or more barcodes located on the wafers. By way of illustration, one or more of the inventories 310 can be adapted to facilitate retrieving the oldest wafer in one or more of the inventories 310. By way of further illustration, one or more of the inventories 310 can be adapted to facilitate retrieving all wafers manufactured by a designated manufacturer.

The system 300 includes a transporter 320 that can move a wafer from the one or more inventories 310 to a barcode reader 330. Although one transporter 320 is illustrated, it is to be appreciated by one skilled in the art that a greater number of transporters 320 can be employed in accordance with the present invention. The transporter 320 can be, but is not limited to being, a mechanical device, a human operator and/or a combination of mechanical devices and/or human operators. Although one barcode reader 330 is illustrated, it is to be appreciated that a greater number of barcode readers 330 can be employed in accordance with the present invention. The barcode reader 330 can be, but is not limited to being, a fixed barcode reader and/or a portable barcode reader. By way of illustration, a mechanical transporter 320 can transport a wafer to a fixed barcode reader 330 via a robotically controlled arm and a conveyor belt, while a human operator transporter 320 may pick a wafer from a bin and pass it under a portable hand held barcode reader 330.

The barcode reader 330 can pass a wafer, and/or information concerning a wafer to a sorter 340. The sorter 340 can be, but is not limited to being, a mechanical device, a human operator and/or a combination of mechanical devices and/or human operators. The sorter 340 can be adapted to distinguish between wafers based, at least in part, on information encoded in the barcode. Such distinguishing can include, but is not limited to, distinguishing between wafers based on manufacture date, distinguishing between wafers based on manufacturer, distinguishing between wafers based on supplier, distinguishing between wafers based on materials in the wafer and distinguishing between wafers based on stages of processing through which a wafer has passed. By way of illustration, wafers of a first thickness can be routed to a first destination by the sorter 340 while wafers of a second thickness can be routed to a second destination.

Wafers routed by the sorter 340 can be transported by a transporter 350 to one or more wafer destinations. The transporter 350 can be, but is not limited to being, a mechanical device, a human operator and/or a combination of one or more mechanical devices and/or one or more human operators. Although one transporter 350 is illustrated, it is to be appreciated that a greater number of transporters can be employed in accordance with the present invention. It is to be further appreciated that although the transporter 320 is illustrated as being a separate entity from the transporter 350, that the transporter 320 and the transporter 350 can be the same entity. By way of illustration, the sorter 340 may determine to route a first wafer to a first inventory in the inventories 310 and may determine to route a second wafer to a second inventory in the inventories 310. The sorter 340 may make such determinations based, at least in part, on information encoded in one or more barcodes on the wafers presented to the sorter 340. Similar routing of unpackaged and/or packaged circuits is facilitated by barcodes associated with such unpackaged and/or packaged circuits.

By way of illustration of the operation of the system 300, the inventories 310 may contain wafers supplied by a plurality of suppliers, wherein each supplier provided wafers from a plurality of production runs on a plurality of dates. An integrated circuit manufacturer may desire to arrange the wafers by supplier, and then sort the wafers by age, to facilitate consuming the oldest wafers first and to facilitate consuming wafers from selected manufacturers in a desired order. The system 300 would thus present wafers from the inventories 310 to the bar code reader 330, which would present information concerning the wafer to the sorter 340. The sorter 340 would then route the wafer to a destination in the inventories 310 according to the desired arrangement.

Figure 4:
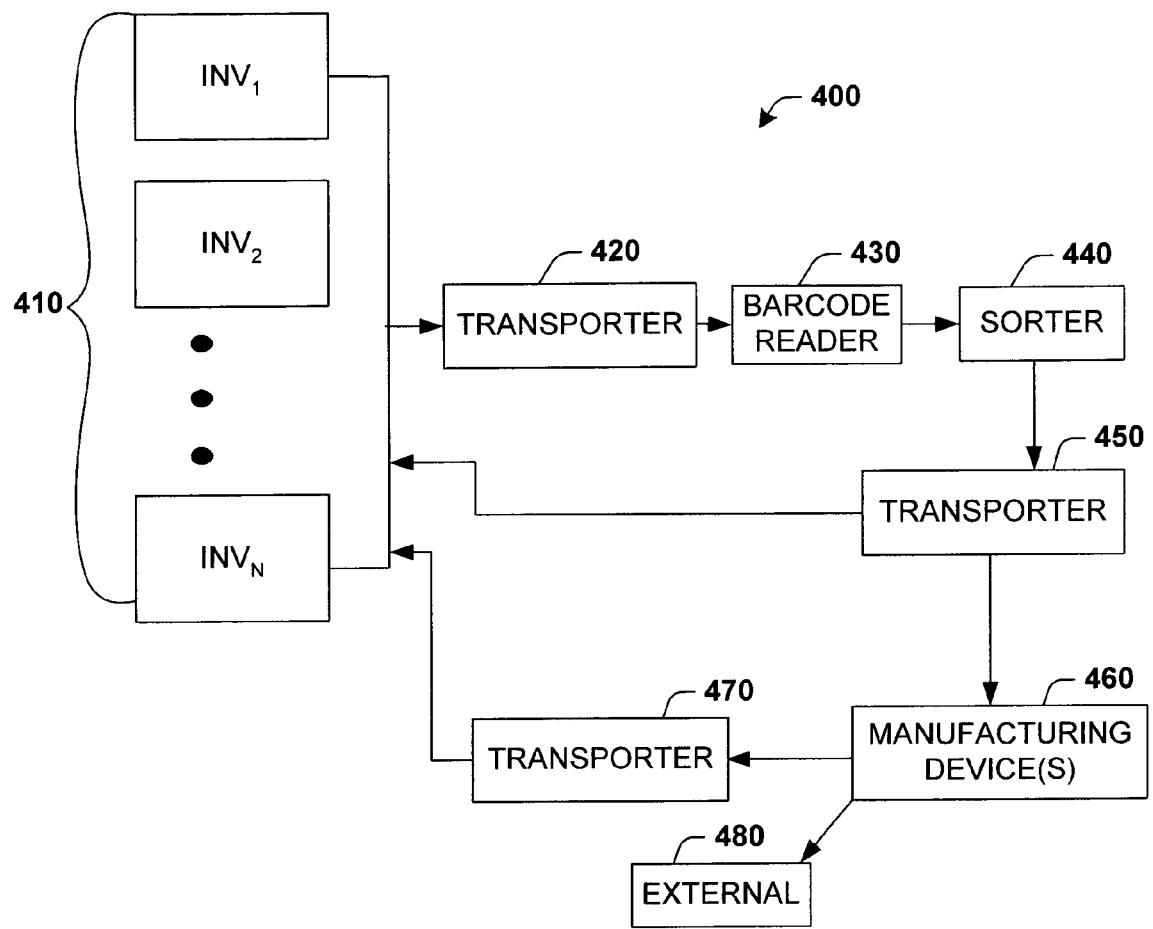
FIG. 4 is a schematic block diagram illustrating a system for performing inventory control of wafers marked with barcodes, the inventory control system operatively connected to one or more manufacturing devices, in accordance with an aspect of the present invention.

Turning now to FIG. 4, a schematic block diagram illustrates a system 400 for performing inventory control of wafers, the wafers being marked with barcodes. While the discussion associated with FIG. 4 deals primarily with wafers, it is to be appreciated that similar inventory control can be achieved for unpackaged and/or packaged circuits similarly marked with one or more barcodes in accordance with an aspect of the present invention.

The inventory control system 400 is operatively connected to a manufacturing device 460. The system 400 includes one or more inventories 410 of wafers, the wafers marked with one or more barcodes. The inventories 410 can be, but are not limited to being, mechanically accessed devices and/or manually accessed devices. The inventories 410 can be, but are not limited to being, located in one central location and/or located in multiple distributed locations. One or more of the inventories 410 can be adapted to facilitate accessing a single designated wafer, the wafer being identified, at least in part, by one or more barcodes located on the wafer. Similarly, one or more of the inventories 410 can be additionally and/or alternatively adapted to facilitate accessing a group of designated wafers, the wafers similarly being identified, at least in part, by one or more barcodes located on the wafer.

The system 400 includes a transporter 420 that can move a wafer from the one or more inventories 410 to a barcode reader 430. Although one transporter 420 is illustrated, it is to be appreciated by one skilled in the art that a greater number of transporters 420 can be employed in accordance with the present invention. The transporter 420 can be, but is not limited to being, a mechanical device, a human operator and/or a combination of mechanical devices and/or human operators. Although one barcode reader 430 is illustrated, it is to be appreciated that a greater number of barcode readers 430 can be employed in accordance with the present invention. The barcode reader 430 can be, but is not limited to being, a fixed barcode reader and/or a portable barcode reader. By way of illustration, a mechanical transporter 420 may transport a wafer to a fixed barcode reader 430 via a jukebox selection system and a turntable delivery system, while a human operator transporter 420 may pick a wafer from a bin and scan it using a portable hand held barcode reader 430.

The barcode reader 430 can pass a wafer, and/or information concerning a wafer to a sorter 440. The sorter 440 can be, but is not limited to being, a mechanical device, a human operator and/or a combination of mechanical devices and/or human operators. The sorter 440 can be adapted to distinguish between wafers based, at least in part, on information encoded in the barcode. Such distinguishing can include, but is not limited to, distinguishing between wafers based on manufacture date, distinguishing between wafers based on manufacturer, distinguishing between wafers based on supplier, distinguishing between wafers based on materials in the wafer and distinguishing between wafers based on stages of processing through which a wafer has passed. By way of illustration, wafers manufactured during a first range of dates can be routed to a first destination by the sorter 440 while wafers manufactured during a second range of dates can be routed to a second destination.

Wafers routed by the sorter 440 can be transported by a transporter 450 to one or more wafer destinations, including but not limited to the inventories 410 and a manufacturing device 460. The transporter 450 can be, but is not limited to being, a mechanical device, a human operator and/or a combination of one or more mechanical devices and/or one or more human operators. Although one transporter 450 is illustrated, it is to be appreciated by one skilled in the art that a greater number of transporters can be employed in accordance with the present invention. It is to be further appreciated that although the transporter 420 is illustrated as being a separate entity from the transporter 450, that the transporter 420 and the transporter 450 can be the same entity. The manufacturing device 460 can be, but is not limited to being, a stepper, a spin track and a polisher. The operation of the barcode reader 430, the sorter 440 and the transporters 420 and 450 thus facilitate controlling delivering wafers to appropriate manufacturing devices 460 in an efficient manner. Such efficient delivery facilitates increasing productivity in integrated circuit manufacturer, leading to reduction in processing times and corresponding reductions in costs.

The manufacturing device 460, when it is finished with the wafer, can route the wafer to a wafer destination. The wafer destinations can include, but are not limited to, the inventories 410, the bar code reader 430, the sorter 440, another manufacturing device 460 and external processes and/or systems 480. Such external processes and/or systems 480 can include, but are not limited to, recycling processes, distribution process, quality assurance processes and packaging processes.

By way of illustration of the operation of the system 400, the inventories 410 may contain wafers supplied by a plurality of suppliers, wherein each supplier provided wafers with varying sets of properties (e.g. thickness). An integrated circuit manufacturer may desire to manufacture integrated circuits from wafers with a desired thickness supplied by a designated supplier. The system 400 would thus present wafers from the inventories 410 to the bar code reader 430, which would present information concerning the wafer to the sorter 440. The sorter 440 would then route the wafer to a manufacturing device 460 according to the desired plan. The manufacturing device 460 can then process the wafer and then route the processed wafer back to the inventories 410 to await further processing.

Figure 5:
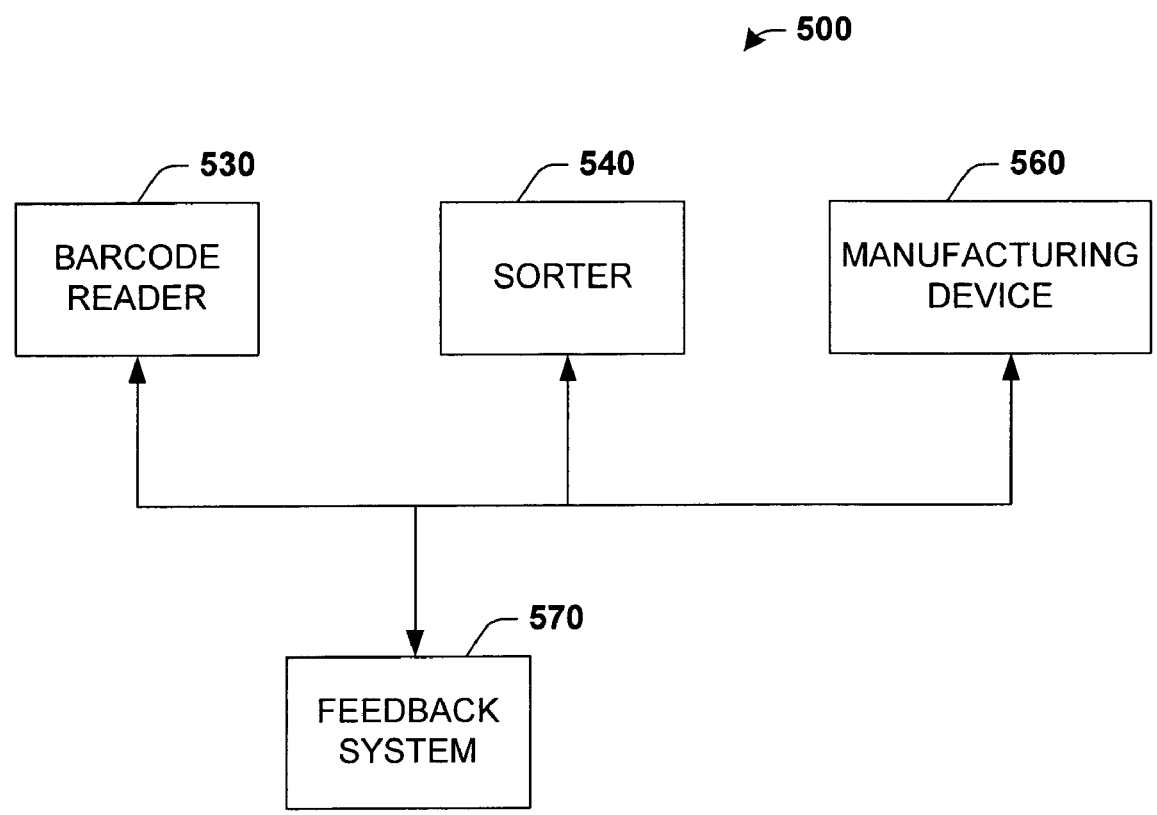
FIG. 5 is a partial schematic block diagram of a system for performing inventory control of wafers marked with barcodes, the inventory control system including a feedback system adapted to receive feedback from one or more feedback generators, in accordance with an aspect of the present invention.

Turning now to FIG. 5, a schematic block diagram illustrates a system 500 for performing inventory control of wafers marked with barcodes. While the discussion associated with FIG. 5 deals primarily with wafers, it is to be appreciated that similar inventory control can be achieved for unpackaged and/or packaged circuits similarly marked with one or more barcodes in accordance with an aspect of the present invention.

The inventory control system 500 including a feedback system 570 for receiving feedback information from one or more feedback generators. The feedback generators can include, but are not limited to a barcode reader 530, a sorter 540 and a manufacturing device 560. The feedback information can include, but is limited to, the processing capacity of a feedback generator, the status of the feedback generator, processing time and/or cost associated with the feedback generator, scheduled maintenance time for the feedback generator, defect rate of the feedback generator and defect rate of a wafer handled by the feedback generator. Although one barcode reader 530, one sorter 540 and one manufacturing device 560 are illustrated in FIG. 5, it is to be appreciated that a greater number of barcode readers, sorters and manufacturing devices can be employed in accordance with the present invention.

The feedback system 570 can process the feedback information and generate control information that can be fed forward to control information receiving devices. The control information receiving devices can include, but are not limited to, a barcode reader 530, a sorter 540 and a manufacturing device 560. The control information can include, but is not limited to, changing the behavior of the control information receiving device (e.g. turn off, slow down, change recipe) and reconfiguring the control information receiving device (e.g. prepare for wafers of a certain thickness). Such feedback information and control information generated by an inventory control system employing barcodes on wafers facilitates improving the efficiency of integrated circuit manufacturing.

Figure 6:
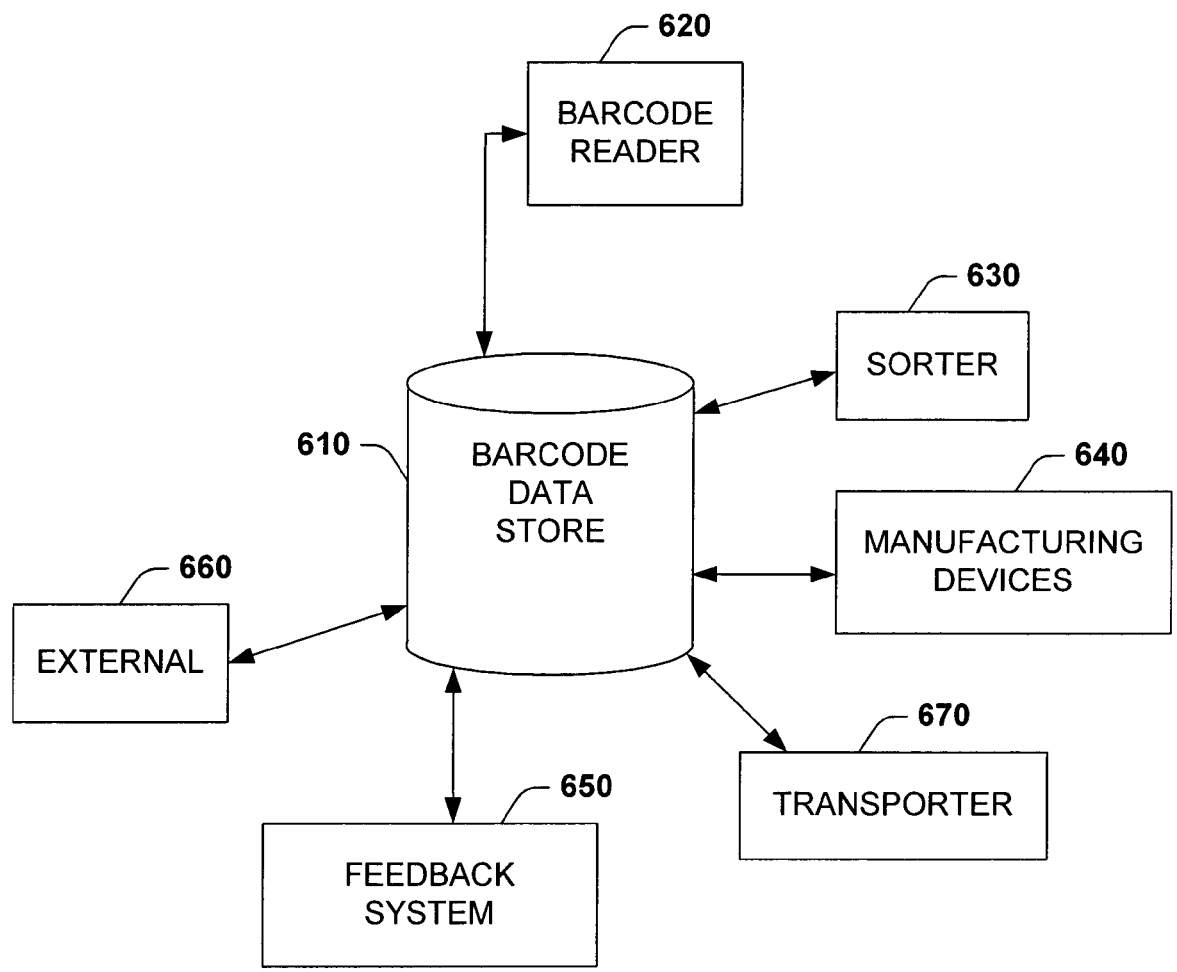
FIG. 6 is a partial schematic block diagram of a system for performing inventory control of wafers marked with barcodes, the system including a barcode data store, in accordance with an aspect of the present invention.

Turning now to FIG. 6, a schematic block diagram illustrates a system 600 for performing inventory control of wafers marked with barcodes, the system including a barcode data store 610. While the discussion associated with FIG. 6 deals primarily with wafers, it is to be appreciated that similar inventory control can be achieved for unpackaged and/or packaged circuits similarly marked with one or more barcodes in accordance with an aspect of the present invention.

The barcode data store 610 can be operatively connected to devices and/or processes including, but not limited to, a barcode reader 620, a sorter 630, a manufacturing device 640, a feedback system 650, an external system and/or process 660 and/or a transporter 670. While a single a barcode reader 620, sorter 630, manufacturing device 640, feedback system 650, external system and/or process 660 and transporter 670 are illustrated in FIG. 6, it is to be appreciated that a greater number of such devices can be employed in accordance with the present invention.

The barcode data store 610 can be one of, or a combination of data structures including, but not limited to, an array, a table, a stack, a queue, a list, a file and a cube. The data store 610 can also be one of, or a combination of databases. The barcode data store 610 can store information including, but not limited to, data for interpreting barcodes, data for mapping barcode codes to wafer information, rules for interpreting barcodes and processing status of one or more wafers. The barcode data store 610 thus facilitates improving integrated circuit manufacturing by providing data concerning wafers in one or more phases of integrated circuit manufacture.

Figure 7:
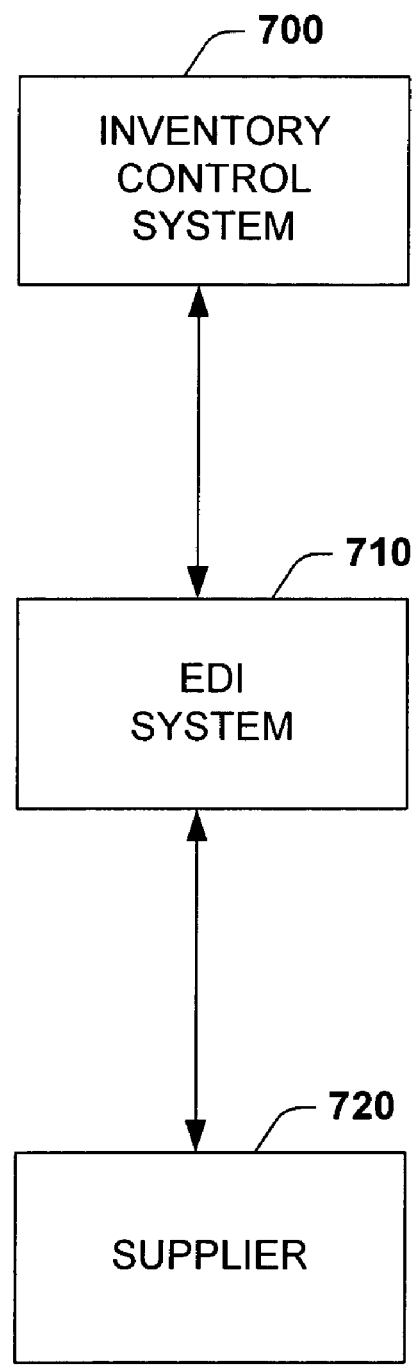
FIG. 7 is a schematic block diagram of a system for performing inventory control of wafers marked with barcodes, the inventory control system operatively connected to an Electronic Data Interchange (EDI) system, in accordance with an aspect of the present invention.

Turning now to FIG. 7, a schematic block diagram illustrates a system for performing inventory control 700 of wafers marked with barcodes. While the discussion associated with FIG. 7 deals primarily with wafers, it is to be appreciated that similar inventory control can be achieved for unpackaged and/or packaged circuits similarly marked with one or more barcodes in accordance with an aspect of the present invention.

The inventory control system 700 is connected to an Electronic Data Interchange (EDI) system 710. The EDI system 710 can also be connected to a supplier 720 of wafers. The EDI system 710 can transmit one or more pieces of EDI data to one or more EDI data destinations, including but not limited to the supplier 720 and one or more integrated circuit manufacturers. The one or more pieces of EDI data can be generated by at least one of a barcode reader, an inventory, a sorter, a manufacturing device and a feedback system.

The EDI data can include, but is not limited to, purchase orders, inventory reports and defect reports. The EDI system 710 thus facilitates efficient integrated circuit manufacturing by mitigating problems with over and/or under supply of wafers and by facilitating detecting defect patterns. By way of illustration, an integrated circuit manufacturer may process a number of wafers sufficient to deplete the integrated circuit manufacturer's wafer inventory below a predetermined threshold, the threshold being associated with the number of days of inventory remaining. The EDI system 710 can detect such a low inventory level and can transmit one or more purchase and/or delivery orders to one or more wafer suppliers. The EDI system 710 can confirm target delivery dates from the one or more suppliers to facilitate preventing the possibility that the integrated circuit manufacturer will run out of wafers. Thus, undersupply problems associated with conventional systems are mitigated. By way of further illustration, an integrated circuit manufacturer may process a number of wafers sufficient to perform statistical analysis on defect rates in the wafers provided by a supplier. The EDI system 710 can perform such statistical analysis and issue additional purchase orders to suppliers producing wafers with low defect rates while reducing or eliminating orders to suppliers producing wafers with high defect rates. Furthermore, the EDI system 710 can cancel orders or generate return orders for suppliers producing wafers with high defect rates. Thus, the overall efficiency of the integrated circuit manufacturing process can be improved.

Figure 8:
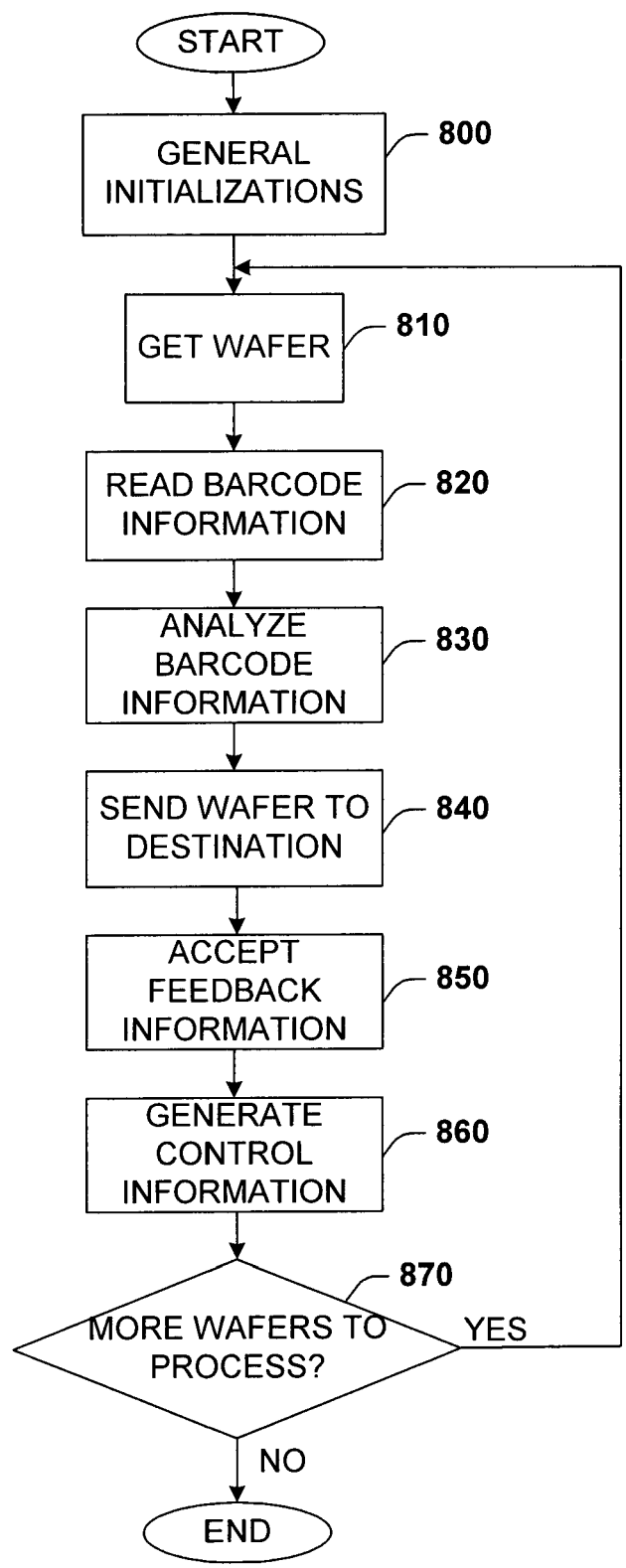
FIG. 8 is a flow chart illustrating a method for performing inventory control of wafers marked with barcodes in accordance with an aspect of the present invention.
Figure 9:
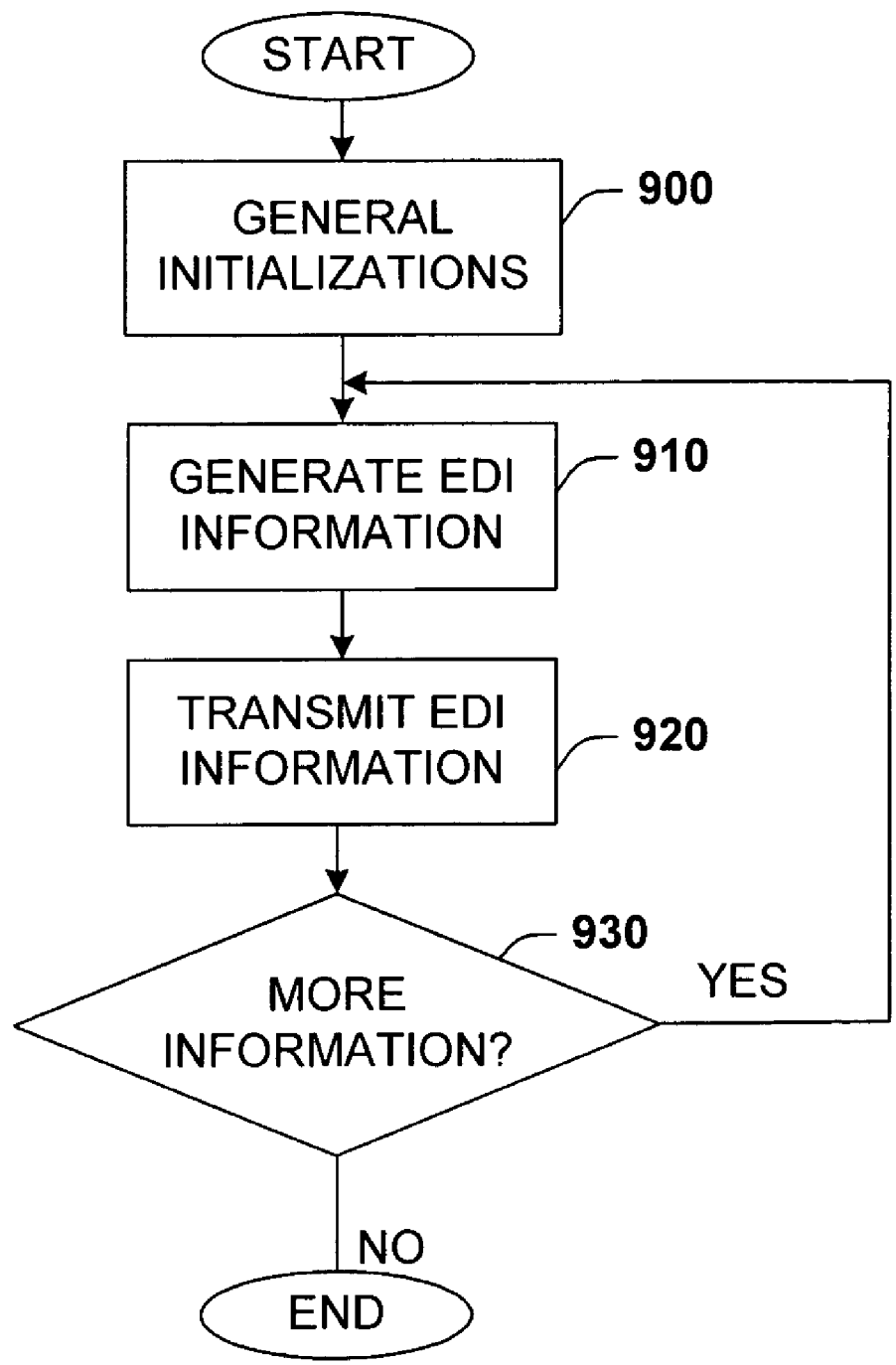
FIG. 9 is a flow chart illustrating a method for performing inventory control of wafers marked with barcodes, the method including generating EDI information in accordance with an aspect of the present invention.

In view of the exemplary systems shown and described above, methodologies that may be implemented in accordance with the present invention will be better appreciated with reference to the flow diagrams of FIGS. 8 and 9. While, for purposes of simplicity of explanation, the methodology of FIGS. 8 and 9 are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

While the discussion associated with the methodologies described in FIG. 8 and FIG. 9 deals primarily with wafers, it is to be appreciated that similar methodologies can be applied to unpackaged and/or packaged circuits similarly marked with one or more barcodes in accordance with an aspect of the present invention, and that such duplicative description is omitted for the sake of brevity.

FIG. 8 is a flow diagram illustrating a methodology for performing inventory control of wafers marked with barcodes. At 800, general initializations are performed. Such initializations can include, but are not limited to, allocating memory, establishing pointers, establishing data communications, initializing variables and instantiating objects. At 810, a wafer is retrieved from a wafer store. Retrieving the wafer from the wafer store may include identifying a wafer to be retrieved, identifying a wafer store from which to retrieve the wafer and moving the wafer from the wafer store to a barcode reader. At 820, barcode information can be read from the wafer. At 830, the barcode information read at 820 is analyzed. Such analysis can include comparing the barcode information read at 820 to barcode information stored in one or more barcode data stores to determine properties including, but not limited to, manufacturing date, manufacturer, current stage of processing, defects and next recipient of the wafer. For example, a piece of data encoded in the barcode, (e.g. wafer thickness), can be analyzed to determine which manufacturing devices, if any, will be employed in future processing of the wafer. At 840, the wafer can be routed to a wafer destination. Routing the wafer can include identifying the wafer to be routed, identifying a wafer destination and moving the wafer. At 850, feedback information can be accepted from one or more entities involved in performing the method illustrated in FIG. 8. For example, devices employed to identify a wafer store can generate feedback information and human operators employed to send a wafer to a destination can generate feedback information. At 860, control information can be generated from the feedback information. The control information of 860 can be employed to alter the behavior of the one or more devices and/or human operators employed in performing the method illustrated in FIG. 8. At 870 a determination is made concerning whether more wafers remain to be processed. If the determination at 870 is YES, then processing returns to 810, otherwise processing concludes.

An alternative example method for performing inventory control provides a method for tracking integrated circuits fabricated from wafers that includes marking a wafer with a first barcode where the first barcode encodes wafer information including, but not limited to, wafer manufacturer, wafer thickness, wafer diameter, date of first processing, apparatus employed in processing the wafer, reticles employed in processing the wafer, wafer composition and a wafer identifier. The wafer information and data sufficient to relate the wafer information to the first barcode are stored in a barcode data store, which facilitates retrieving such information for correlations to unpackaged integrated circuits fabricated from the wafer and/or packaged integrated circuits fabricated from the wafer. Such correlations may be desired, for example, to relate integrated circuit performance in the field to wafer supplies, manufacturing conditions, production runs, and so on.

In the alternative example method for performing inventory control, integrated circuits being fabricated on the wafer are marked with one or more second barcodes that encode information sufficient to identify the wafer from which the integrated circuit was fabricated by relating the second barcodes to the first barcode and/or the wafer information. The second barcodes may further encode fabrication information related to the fabrication of the integrated circuit including, but not limited to wafer manufacturer, wafer thickness, wafer diameter, date of first processing, apparatus employed in processing the wafer, wafer composition, integrated circuit manufacturer, apparatus employed in fabricating the integrated circuit, reticles employed in fabricating the integrated circuit, fabrication steps performed on the integrated circuit, date of fabrication, position on the wafer, an integrated circuit identifier and the wafer identifier. The fabrication information and data sufficient to relate the fabrication information to the one or more second barcodes is stored in the barcode data store.

In the alternative example method for performing inventory control, packaged integrated circuits fabricated from the wafer are marked with one or more third barcodes that encode information sufficient to identify the wafer from which the packaged integrated circuit was fabricated by relating the third barcodes to the first barcode and/or the wafer information. The third barcodes may further encode packaging information related to the packaging of the integrated circuit including, but not limited to wafer manufacturer, wafer thickness, wafer diameter, date of first processing, apparatus employed in processing the wafer, wafer composition, integrated circuit manufacturer, apparatus employed in fabricating the integrated circuit, reticles employed in fabricating the integrated circuit, date of fabrication, position on the wafer, apparatus employed in packaging the integrated circuit, packaging date, the integrated circuit identifier, the wafer identifier and a packaging identifier.

The packaging information and data sufficient to relate the packaging information to the one or more third barcodes are stored in the barcode data store. It is to be appreciated that this alternative example method is but one of a number of possible such alternative methods that employ barcode markings on a wafer, an integrated circuit as it is being fabricated and/or a barcode marking on a completed, packaged integrated circuit.

FIG. 9 is a flow diagram illustrating a methodology for generating and transmitting one or more pieces of Electronic Data Interchange (EDI) data. At 900, general initializations are performed. Such initializations can include, but are not limited to, allocating memory, establishing pointers, establishing data communications, initializing variables and instantiating objects. At 910, EDI data can be generated. By way of illustration, purchase orders, defect reports, order cancellations and expedited delivery orders can be generated. Such information can be generated from information collected from one or more processes involved in performing inventory control on wafers, unpackaged circuits and/or packaged circuits marked with barcodes. By way of illustration, one or more processes may report information including, but not limited to, the type and number of wafers processed by an integrated circuit manufacturer. The EDI method may then aggregate such information, analyze the information and determine to generate a purchase order. At 920, EDI data can be transmitted to one or more EDI data destinations. For example, a purchase order can be forwarded to a wafer supplier. Thus, problems with over supply and/or undersupply associated with conventional systems are mitigated. At 930 a determination is made concerning whether more EDI data is to be generated. If the determination at 930 is YES, then processing continues at 910, otherwise processing concludes.

Figure 10:
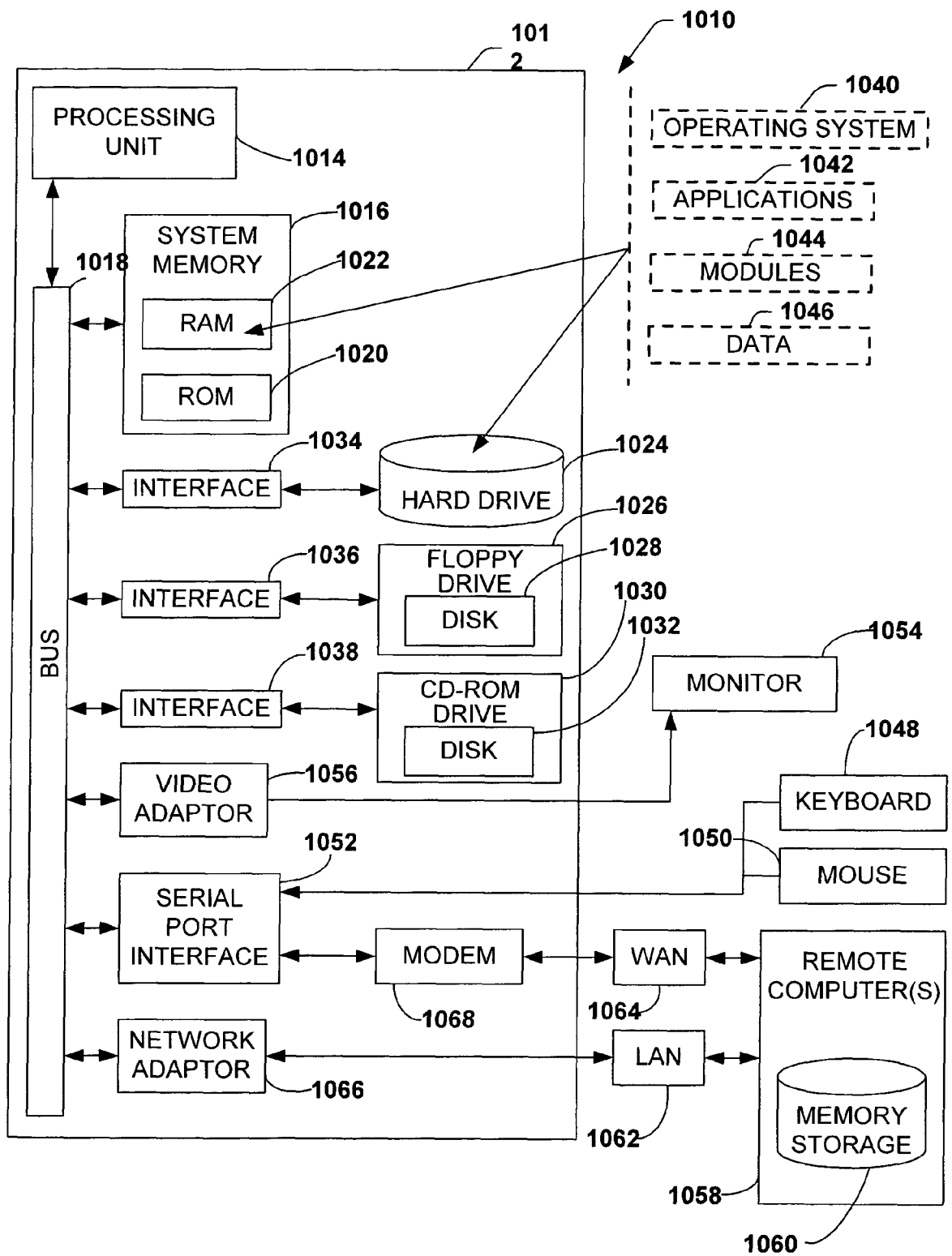
FIG. 10 is a schematic block diagram of an exemplary system of an operating environment for a system configured in accordance with the present invention.

In order to provide additional context for various aspects of the present invention, FIG. 10 and the following discussion are intended to provide a brief, general description of a suitable computing environment 1010 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 10, an exemplary environment 1010 for implementing various aspects of the invention includes a computer 1012, the computer 1012 including a processing unit 1014, a system memory 1016 and a system bus 1018. The system bus 1018 couples system components including, but not limited to the system memory 1016 to the processing unit 1014. The processing unit 1014 may be any of various commercially available processors. Dual microprocessors and other multi-processor architectures also can be employed as the processing unit 1014.

The system bus 1018 can be any of several types of bus structure including a memory bus or memory controller, a peripheral bus and a local bus using any of a variety of commercially available bus architectures. The system memory 1016 includes read only memory (ROM) 1020 and random access memory (RAM) 1022. A basic input/output system (BIOS), containing the basic routines that help to transfer information between elements within the computer 1012, such as during start-up, is stored in ROM 1020.

The computer 1012 further includes a hard disk drive 1024, a magnetic disk drive 1026, (e.g., to read from or write to a removable disk 1028) and an optical disk drive 1030, (e.g., for reading a CD-ROM disk 1032 or to read from or write to other optical media). The hard disk drive 1024, magnetic disk drive 1026 and optical disk drive 1030 can be connected to the system bus 1018 by a hard disk drive interface 1034, a magnetic disk drive interface 1036 and an optical drive interface 1038, respectively. The drives and their associated computer-readable media provide nonvolatile storage of data, data structures, computer-executable instructions, etc. for the computer 1012, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1022, including an operating system 1040, one or more application programs 1042, other program modules 1044 and program data 1046. It is to be appreciated that the present invention can be implemented with various commercially available operating systems or combinations of operating systems.

A user can enter commands and information into the computer 1012 through a keyboard 1048 and a pointing device, such as a mouse 1050. Other input devices (not shown) may include a microphone, an IR remote control, a joystick, a game pad, a satellite dish, a scanner, or the like. These and other input devices are often connected to the processing unit 1014 through a serial port interface 1052 that is coupled to the system bus 1018, but may be connected by other interfaces, such as a parallel port, a game port, a universal serial bus ("USB"), an IR interface, etc. A monitor 1054 or other type of display device is also connected to the system bus 1018 via an interface, such as a video adapter 1056. In addition to the monitor, a computer typically includes other peripheral output devices (not shown), such as speakers, printers etc.

The computer 1012 may operate in a networked environment using logical connections to one or more remote computers, such as a remote computer(s) 1058. The remote computer(s) 1058 may be a workstation, a server computer, a router, a personal computer, microprocessor based entertainment appliance, a peer device or other common network node, and typically includes many or all of the elements described relative to the computer 1012, although, for purposes of brevity, only a memory storage device 1060 is illustrated. The logical connections depicted include a local area network (LAN) 1062 and a wide area network (WAN) 1064. Such networking environments are commonplace in offices, enterprise-wide computer networks, intranets and the Internet.

When used in a LAN networking environment, the computer 1012 is connected to the local network 1062 through a network interface or adapter 1066. When used in a WAN networking environment, the computer 1012 typically includes a modem 1068, or is connected to a communications server on the LAN, or has other means for establishing communications over the WAN 1064, such as the Internet. The modem 1068, which may be internal or external, is connected to the system bus 1018 via the serial port interface 1052. In a networked environment, program modules depicted relative to the computer 1012, or portions thereof, may be stored in the remote memory storage device 1060. It will be appreciated that the network connections shown are exemplary and other means of establishing a communications link between the computers may be used.

Figure 11:
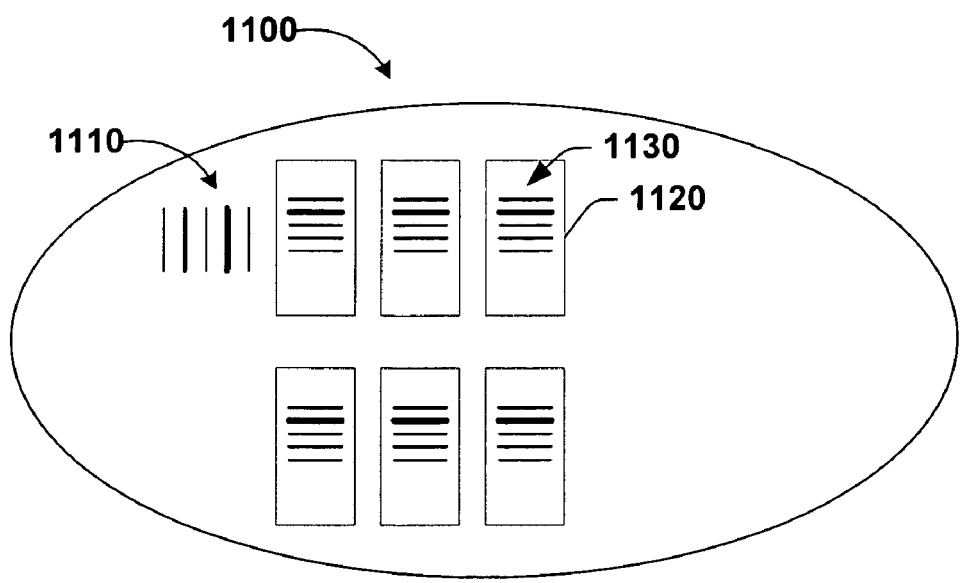
FIG. 11 is a top view of a wafer product marked with a barcode, an unpackaged circuit marked with a barcode and a packaged circuit marked with a barcode in accordance with the present invention.
Figure 11:
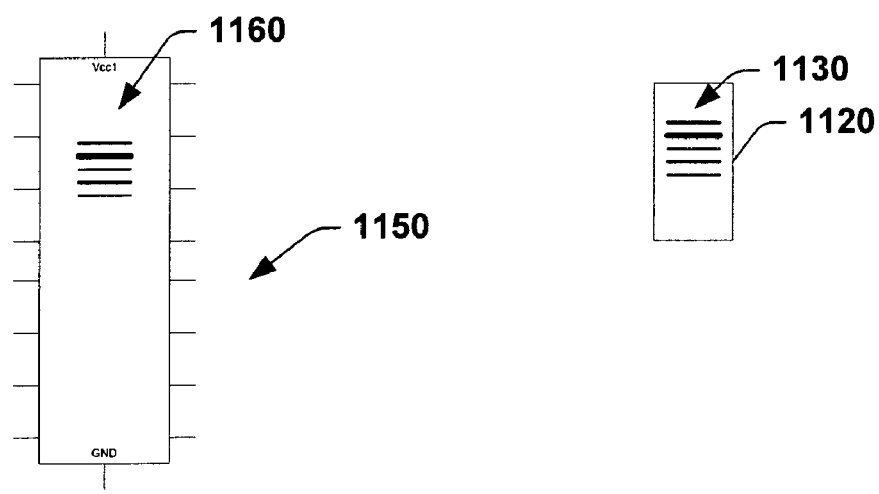

Referring now to FIG. 11, a wafer 1100, an unpackaged integrated circuit 1120 and a packaged integrated circuit 1150 are illustrated. The wafer 1100 is marked with a barcode 1110. The barcode 1110 may be employed for inventory control of the wafer, as described above. But the barcode 1110 may also be employed for inventory and/or quality control actions related to the circuits manufactured on the wafer 1100. To facilitate such inventory and/or quality control actions, circuits being manufactured on the wafer 1100 may also be marked with barcodes. For example, the circuit 1120 can be marked with the barcode 1130. The barcode 1130 may be related to the barcode 1110 in one or more ways. By way of illustration, information encoded in the barcode 1130 may be decodable to identify from which wafer a circuit was manufactured. By way of further illustration, the information encoded in the barcode 1130 may be employed to code information including, but not limited to, a location on the wafer where the circuit was fabricated, one or more reticles that were employed to fabricate the circuit, date of fabrication, fabrication process conditions and the intended recipient of the circuit. Such information can then be employed for inventory control (e.g., tracking circuit location) and/or quality control (e.g., correlating circuit flaws to wafers, process conditions, date of manufacture, reticles).

The circuit 1120 that is fabricated on the wafer 1100 may be cut from the wafer 1100 and spend a period of time as a loose, unpackaged circuit. The barcode 1130 can be employed to store, retrieve and route the unpackaged circuit to facilitate subsequent manufacturing steps, for example. The circuit 1120 may eventually be packaged into a packaged circuit 1150. The packaged circuit 1150 may also be marked with a barcode 1160. The barcode 1160 may be employed for purposes including, but not limited to, inventory control, quality control and EDI processing. For example, the barcode 1160 may contain information similar to the barcode 1130, (e.g., a location on the wafer where the circuit was fabricated, one or more reticles that were employed to fabricate the circuit, date of fabrication, fabrication process conditions). Such information can then be employed in tasks including, but not limited to, internal inventory control (e.g., tracking circuit location in fabrication facility), external inventory control (e.g., tracking circuit location in manufactured goods and circuit recipient inventories), internal quality control (e.g., correlating circuit flaws to wafers, process conditions, date of manufacture, reticles, packaging apparatus) and external quality control (e.g., facilitating product recalls, facilitating service calls). The presence of the bar code 1160 on the packaged circuit 1150 facilitates correlating chip performance in the field (e.g., embedded in a machine) to manufacturing process conditions that can be employed to determine optimal process conditions. By way of illustration, three production runs may be made for a type of integrated circuit (e.g., embedded microprocessor for automotive brake control). Over time (e.g., a period of years), patterns may emerge concerning which of the embedded microprocessors proved most reliable in the field. Recognizing and recording such patterns can be facilitated by the presence of the bar code 1160 and the data encoded in that bar code. Conventional systems for performing such field correlations may require extensive record keeping and may suffer from difficult data entry. But the present system, by providing a readable bar code, mitigates such record keeping and data entry problems, providing advantages over conventional systems.

It is to be appreciated that the barcodes 1160, 1130 and 1110 may contain identical information, substantially similar information, substantially different information and/or completely different information. It is to be further appreciated that the barcodes 1160, 1130 and 1110 may be encoded in similar formats and/or dissimilar formats (e.g., 1110 is three of nine format, 1130 is code ninety three format, 1160 is interleaved code two of five format). Furthermore, it is to be appreciated that the barcodes 1160, 1130 and 1110 may be fabricated into the wafer 1100, the circuit 1120 and the packaged circuit 1160 (e.g., etched into the surface of the wafer 1100, the circuit 1120 and the packaged circuit 1160) and/or may be placed on the wafer 1100, the circuit 1120 and the packaged circuit 1160 (e.g., a sticker attached to the wafer 1100, the circuit 1120 and the packaged circuit 1160).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for performing inventory control, comprising:
one or more inventories adapted to store at least one of wafers, unpackaged circuits and packaged circuits, where the wafers are suitable for processing into integrated circuits, and where at least one of the wafers, the unpackaged circuits and the packaged circuits are marked with one or more barcodes;
one or more barcode readers operable to read three or more barcodes, at least one of a third barcodes coupled to the integrated circuits and encodes information sufficient to identify the wafers from which the integrated circuits were fabricated by relating the third barcodes coupled to the integrated circuits to at least one of a first barcode, the wafer information stored in a data store, one or more second barcodes and fabrication information stored in the data store, the third barcodes further encoding packaging information related to packaging of the integrated circuits; and
one or more sorters adapted to route at least one of wafers, unpackaged circuits and packaged circuits to one or more inventories based, at least in part, on information encoded by the two or more barcodes.

2. The system of claim 1, wherein the barcodes are formatted according to at least one of, three of nine format, code ninety three format, interleaved code two of five format, code one twenty eight format, Colorado barcode format and two-dimensional format.

3. The system of claim 1, further comprising one or more transporters adapted to move one or more wafers, unpackaged circuits and packaged circuits between the one or more inventories, the one or more barcode readers and the one or more sorters.

4. The system of claim 1, wherein:
at least one of the one or more inventories is partitioned into one or more addressable locations;
at least one of the one or more inventories is operable to selectively retrieve an individual designated wafer, unpackaged circuit and/or packaged circuit from an addressable location; and
at least one of the one or more inventories is further operable to selectively deposit at least one of an individual designated wafer, unpackaged circuit and packaged circuit in an addressable location.

5. The system of claim 1, wherein:
at least one of the one or more inventories is partitioned into one or more addressable locations;
at least one of the one or more inventories is adapted to selectively retrieve one or more groups of designated wafers, unpackaged circuits and packaged circuits from one or more addressable locations; and
at least one of the one or more inventories is further adapted to selectively deposit groups of designated wafers, unpackaged circuits and packaged circuits in one or more addressable locations.

6. The system of claim 1, wherein the sorter is adapted to selectively route at least one of wafers, unpackaged circuits and packaged circuits to one or more inventories based on at least one of age, location, supplier, stage of manufacturer and defect information.

7. The system of claim 1, further comprising:
one or more manufacturing devices adapted to perform one or more manufacturing processes on at least one of the wafers, the unpackaged circuits and/or the packaged circuits; and
where the one or more sorters are further adapted to route at least one of wafers, unpackaged circuits and packaged circuits to the one or more manufacturing devices based, at least in part, on information encoded by the one or more barcodes.

8. The system of claim 7, wherein the one or more manufacturing devices include at least one of, a stepper and a spin track.

9. The system of claim 8, further comprising:
one or more feedback systems adapted to receive feedback information from at least one of the one or more barcode readers, the one or more sorters and the one or more manufacturing devices, the one or more feedback systems adapted to generate control information that is fed forward to at least one of the one or more barcode readers, the one or more sorters and the one or more manufacturing devices.

10. The system of claim 1, further comprising:
one or more inventory control data stores, at least one of the one or more inventory control data stores operably connected to at least one of the one or more barcode readers, to at least one of the one or more sorters and to at least one of the one or more inventories.

11. The system of claim 10, the one or more inventory control data stores comprising at least one of a database, an array, a table, a stack, a queue, a list and a file.

12. The system of claim 11, wherein the one or more inventory control data stores are operably connected to at least one of the one or more manufacturing devices.

13. The system of claim 11, wherein the one or more inventory control data stores are operably connected to at least one of the one or more feedback systems.

14. A method for performing inventory control, comprising:
retrieving a wafer from a wafer store, the wafer being suitable for processing into integrated circuits;
reading a first barcode on the wafer, a second barcode marked on the integrated circuits, and a third barcode marked on the integrated circuit, the second barcode encodes the identity of the wafer on which the integrated circuits are fabricated by relating the second barcode to the first barcode and wafer information, the third barcode encodes information sufficient to identify the wafer from which the integrated circuit was fabricated by relating the third barcodes to at least one of the first barcode, wafer information stored in a data store, the second barcode and fabrication information stored in the data store, the third barcode further encodes packaging information related to packaging of the integrated circuit; and
sending the wafer to a wafer destination based, at least in part, on information encoded in the first barcode.

15. The method of claim 14, wherein retrieving a wafer from a wafer store comprises:
identifying a wafer store from which to retrieve a wafer;
identifying a wafer to retrieve from a wafer store; and
moving the wafer from the wafer store to a barcode reader.

16. The method of claim 15, wherein sending a wafer to wafer store comprises:
identifying a wafer store to which to route a wafer;
identifying a wafer to route to the wafer store; and
moving the wafer to the wafer store.

17. The method of claim 16, further comprising:
accessing stored data associated with information encoded on a barcode on a wafer; and
controlling one or more behaviors of one or more wafer destinations based at least in part on accessing the stored data.

18. The method of claim 17, wherein the stored data includes at least one of, wafer age, wafer location, wafer manufacturer, stage of wafer processing completed, next stage of wafer processing to be performed and wafer defects.

19. The method of claim 14, further comprising:
accepting feedback information from the one or more wafer destinations.

20. The method of claim 19, wherein the feedback information includes at least one of, wafer source status information and wafer destination status information.

21. The method of claim 20, wherein the wafer source status information includes at least one of an availability of a wafer source, a capacity of a wafer source, an identifier of a wafer in a wafer source and a count of wafers in a wafer source.

22. The method of claim 20, wherein the wafer destination status information includes at least one of an availability of a wafer destination, a capacity of a wafer destination, an identifier of a wafer in a wafer destination and a count of wafers in a wafer destination.

23. The method of claim 19, further comprising:
generating control information based on the feedback information, the control information employable to adapt the behavior of at least one of the wafer sources, at least one of the wafer destinations, or at least one of both a wafer source and a wafer destination.

24. The method of claim 14 further comprising:
collecting information from the one or more wafer stores; and sending information to the one or more wafer destinations.

25. A computer readable medium containing computer executable instructions operable to perform a method for performing inventory control, comprising:
retrieving a wafer from a wafer store, the wafer being suitable for processing into integrated circuits;
reading a first barcode on the wafer, a second barcode marked on the integrated circuits, and a third barcode marked on the integrated circuit, the second barcode encodes the identity of the wafer on which the integrated circuits are fabricated by relating the second barcode to the first barcode and wafer information, the third barcode encodes information sufficient to identify the wafer from which the integrated circuit was fabricated by relating the third barcode to at least one of the first barcode, wafer information stored in a data store, the second barcode and fabrication information stored in the data store, the third barcode further encodes packaging information related to the packaging of the integrated circuit; and
sending the wafer to a wafer destination based, at least in part, on information encoded in the first barcode.

26. A method for tracking integrated circuits fabricated from wafers, comprising:
marking a wafer with a fist barcode, the wafer suitable for processing into integrated circuits, the first barcode encoding a wafer information;
storing the wafer information and data sufficient to relate the wafer information to the first barcode in a barcode data store;
marking an integrated circuit being fabricated on the wafer with one or more second barcodes, the second barcodes encoding information sufficient to identify the wafer from which the integrated circuit was fabricated by relating the second barcodes to at least one of the first barcode and the wafer information, the second barcodes further encoding a fabrication information related to the fabrication of the integrated circuit;
storing the fabrication information and data sufficient to relate the fabrication information to the one or more second barcodes in the barcode data store;
marking a packaged integrated circuit fabricated from the wafer with one or more third barcodes, the third barcodes encoding information sufficient to identify the wafer from which the packaged integrated circuit was fabricated by relating the third barcodes to at least one of the first barcode, the wafer information stored in the data store, the one or more second barcodes and the fabrication information stored in the data store, the third barcodes further encoding a packaging information related to the packaging of the integrated circuit; and
storing the packaging information and data sufficient to relate the packaging information to the one or more third barcodes in the barcode data store.

27. The method of claim 26, wherein the wafer information comprises at least one of wafer manufacturer, wafer thickness, wafer diameter, date of first processing, apparatus employed in processing the wafer, reticles employed in processing the wafer, wafer composition and a wafer identifier.

28. The method of claim 27, wherein the fabrication information comprises at least one of wafer manufacturer, wafer thickness, wafer diameter, date of first processing, apparatus employed in processing the wafer, wafer composition, integrated circuit manufacturer, apparatus employed in fabricating the integrated circuit, reticles employed in fabricating the integrated circuit, fabrication steps performed on the integrated circuit, date of fabrication, position on the wafer, an integrated circuit identifier and the wafer identifier.

29. The method of claim 28, wherein the packaging information comprises at least one of wafer manufacturer, wafer thickness, wafer diameter, date of first processing, apparatus employed in processing the wafer, wafer composition, integrated circuit manufacturer, apparatus employed in fabricating the integrated circuit, reticles employed in fabricating the integrated circuit, date of fabrication, position on the wafer, apparatus employed in packaging the integrated circuit, packaging date, the integrated circuit identifier, the wafer identifier and a packaging identifier.

30. A data packet adapted to be transmitted between two or more computer processes, the data packet containing information related to identifying a wafer based on information encoded in a first barcode marked on an integrated circuit coupled to the wafer by relating the barcode on the integrated circuit to a second barcode marked on the wafer and wafer information, and information related to a third barcode on the integrated circuit encoding information sufficient to identify the wafer from which the integrated circuit was fabricated by relating the third barcode to at least one of the first barcode, wafer information stored in a data store, the second barcode and fabrication information stored in the data store, the third barcode further encoding packaging information related to the packaging of the integrated circuit.

* * * * *